United States Patent
Tillotson

(10) Patent No.: US 10,250,318 B2
(45) Date of Patent: Apr. 2, 2019

(54) PROCESS AND MACHINE FOR AIRCRAFT ALTITUDE CONTROL

(71) Applicant: The Boeing Company, Chicago, IL (US)

(72) Inventor: Brian Jay Tillotson, Seattle, WA (US)

(73) Assignee: The Boeing Company, Chicago, IL (US)

( * ) Notice: Subject to any disclaimer, the term of this patent is extended or adjusted under 35 U.S.C. 154(b) by 74 days.

(21) Appl. No.: 15/606,972

(22) Filed: May 26, 2017

(65) Prior Publication Data

US 2018/0343050 A1 Nov. 29, 2018

(51) Int. Cl.
*H04B 7/185* (2006.01)
*G01C 5/06* (2006.01)
*G01C 5/00* (2006.01)

(52) U.S. Cl.
CPC ......... *H04B 7/18506* (2013.01); *G01C 5/005* (2013.01); *G01C 5/06* (2013.01)

(58) Field of Classification Search
CPC ....... H04B 7/18506; G01C 5/06; G01C 5/005
USPC .......................................................... 701/11
See application file for complete search history.

(56) References Cited

U.S. PATENT DOCUMENTS

| 5,402,116 A * | 3/1995 | Ashley | G01C 5/005 |
| | | | 340/10.41 |
| 9,734,723 B1 * | 8/2017 | Bruno | G08G 5/0039 |
| 2007/0239326 A1 * | 10/2007 | Johnson | G08G 5/0086 |
| | | | 701/9 |

* cited by examiner

*Primary Examiner* — Isaac G Smith
(74) *Attorney, Agent, or Firm* — Yee & Associates, P.C.

(57) ABSTRACT

Embodiments are described for a machine and process that include a computer code specially programmed on a non-transitory medium to change an altitude, of an aircraft that remains certified for flight by a pilot, such that the aircraft contains an altimeter having a fixed altimeter setting. The computer code may be configured to: receive an assigned altitude and a barometric pressure for a location of the aircraft; determine a differential between a height above mean sea level indicated on an altimeter using the new barometric pressure for the location of the aircraft and a height above mean sea level indicated on an altimeter based upon the fixed altimeter setting; modify, based upon the differential, a flight planned altitude for the aircraft, to create a pilotless altitude; send the pilotless altitude to the aircraft; and fly the aircraft at the assigned altitude via commanding flight at the pilotless altitude.

20 Claims, 8 Drawing Sheets

PROCESS AND MACHINE FOR AIRCRAFT ALTITUDE CONTROL

BACKGROUND INFORMATION

1. Field

The present disclosure relates generally to control of altitude of an aircraft and, in particular, to a process and machine for controlling altitude of the aircraft flying through regions with different barometric pressures while maintaining a constant barometric pressure setting on an altimeter in the aircraft.

2. Background

Air traffic controllers assign aircraft an altitude above mean sea level that the aircraft must maintain while flying in a particular region of airspace. As the aircraft travels through a region and/or various regions of airspace, air traffic controllers issue a barometric pressure setting for the aircraft to use for maintaining the assigned altitude.

Aircraft may be certified to fly within airspace controlled by an air traffic control facility. Without limitation, certification may be an airworthiness certificate issued by an authority controlling the airspace, such as, without limitation, the U.S. Federal Aviation Administration.

Certification to fly the aircraft within certain airspace may be based upon operation of the aircraft including particular capabilities and/or equipment being functional and/or certified in the aircraft, and/or based upon operation of the aircraft by a particular number of flight crew members, who may also require a certification. Individual instruments and/or combinations of instruments within in a certified aircraft may also require a particular certification to be considered as fulfilling a particular required capability for the aircraft. Without limitation, as an example, U.S. 14 CFR §§ 21, 23, 25, 27, 29, 31, 39, 43, 45, 47, and/or 91 may establish requirements for aircraft equipment and/or airworthiness certifications.

Certification for an aircraft to fly within certain airspace or carrying certain passengers or loads may require some particular number of flight crew members. In addition to requirements in the regulations above, without limitation, as an example, U.S. 14 CFR §§ 121, 125, and/or 135 may establish certain crew requirements for aircraft equipment and/or airworthiness certifications for operating an aircraft in a particular region of airspace, or carrying certain passengers or loads.

Additional and/or different regulations may apply to operating an aircraft without a flight crew member on board, herein referred to as an unmanned aircraft. Without limitation, as an example, U.S. 14 CFR 47 and 107 may establish certain requirements for equipment and operation of unmanned aircraft. Currently, equipment required for certification of an unmanned aircraft may be different than equipment required for certification of an aircraft flown by a flight crew member. A flight crew member may include one or more pilots as required for a particular aircraft. In particular, altimetry systems required for certification of an unmanned aircraft may be different than equipment required for certification of an aircraft flown by a flight crew member. As a non-limiting example, an unmanned aircraft may be equipped without a visible altimeter such as would be used in a piloted aircraft.

Indications of altitude of an aircraft as a height above mean sea level (AMSL) are presented by an altimeter in the aircraft. The indications depend upon a barometric pressure value entered into the altimeter. Indications of height above mean sea level on an altimeter may depend upon the barometric pressure entered into the altimeter by a pilot using a selector on the altimeter, a barometric pressure selector, such as, without limitation, a knob on the altimeter in the aircraft. A pilot, which may include an autopilot system, of the aircraft uses an altitude indicated on the altimeter to control an altitude, a height above mean seal level (AMSL), of the aircraft.

Currently, attempting to fly an aircraft certified with an altimeter that requires a barometric pressure selector at an assigned altitude without a flight crew member on board (who sets the barometric pressure selector on the altimeter to the barometric pressure given to the aircraft by a controller for the region in which the aircraft is flying) is not possible. Although some unmanned aircraft are certified to fly without an altimeter that has a barometric pressure selector set by a flight crew member on the aircraft, attempting to fly an aircraft that currently has an altimeter that has a barometric pressure selector set by a flight crew member on the aircraft, without a flight crew member on board the aircraft, would require retrofitting the aircraft with new systems and/or equipment certified to control the altitude of the aircraft without relying upon the altimeter installed on the aircraft that requires the flight crew member to set a current barometric pressure in a selector on the altimeter for each region the aircraft flies through.

Such a retrofit would likely require a new certification for the aircraft. Also, such a retrofit might replace the altimeter installed on the aircraft that requires the flight crew member to set a current barometric pressure in a selector on the altimeter.

Alternatively, it may be desired that the aircraft might be flown with or without a flight crew member on board. A current technical solution to allow the aircraft to be flown with or without a flight crew member on board may be to add an altimeter for pilotless flight or other new system into the aircraft in addition to the altimeter installed on the aircraft that requires the flight crew member to set a current barometric pressure in a selector on the altimeter.

An aircraft operator may desire to fly an aircraft that remains certified for flight with a pilot, but without any flight crew member on board without suffering expenses of time, effort, and finances that may be required to retrofit the aircraft with new altimetry or other aircraft systems to control the altitude of the aircraft without any flight crew member on board. Retrofitting an aircraft, currently certified to fly, with a new type of altimeter or altimetry system and/or an altitude control system for the aircraft may also require a new certification of the new configuration before the aircraft is allowed to fly in controlled airspace. In addition to the time, man hours, equipment, and expense of the retrofit, obtaining the new certification may require unwanted time, man hours, equipment, and expense from an aircraft operator. An aircraft operator may be any individual or entity responsible for operating the aircraft. Without limitation, an operator may be an individual owner of the aircraft, a corporation, or a company engaged in carry of passengers and/or cargo for hire.

Further, an operator may want to fly the aircraft at times with a flight crew on board, such as, without limitation, a pilot. The operator may also desire to fly the same aircraft at some times without any flight crew on board the same aircraft. Hence, to meet such a desire, even if the aircraft had a new altimetry system added for pilotless flight, it may still need to retain an altimeter presently installed and certified in the aircraft and all associated equipment in communication with the altimeter presently installed and certified in the aircraft.

Hence, an operator may desire to overcome the unwanted time, man hours, equipment, and expense for an aircraft, currently certified for flight by at least one flight crew member, to be equipped to fly unmanned and also remain certified for flight with at least one flight crew member to retain the altimeter presently installed and certified in the aircraft as well as adding a new altimetry system for controlling the altitude of the aircraft when flown without a flight crew member. Thus, an aircraft operator desiring to fly an aircraft that is currently certified for flight with a flight crew member that can set a barometric pressure, for a region the aircraft flies through, into a selector for barometric pressure in an altimeter installed on the aircraft, may desire to overcome the technical problem of controlling the altitude of the aircraft without removing and/or retrofitting equipment currently installed on the aircraft.

Therefore, it would be desirable to have a method and apparatus that take into account at least some of the issues and technical problems discussed above, as well as other possible issues. For example, it would be desirable at least to have a process and machine that provide the technical effects required to fly an aircraft through controlled airspace with or without a flight crew member on board the aircraft, without requiring any new and/or currently uncertified equipment on the aircraft and/or requiring a recertification of the aircraft for flight.

SUMMARY

An embodiment of the present disclosure provides for a machine that comprises a computer code specially programmed on a non-transitory medium to change an altitude, of an aircraft that remains certified for flight by a pilot, such that the aircraft contains an altimeter having a fixed altimeter setting. The computer code may be configured to: receive an assigned altitude for the aircraft to fly; receive a barometric pressure for a location of the aircraft; receive a new barometric pressure for the location of the aircraft; determine a differential between a height above mean sea level indicated on an altimeter using the new barometric pressure for the location of the aircraft and a height above mean sea level indicated on an altimeter based upon the fixed altimeter setting; modify, based upon the differential, a flight planned altitude for the aircraft, to create a pilotless altitude; send the pilotless altitude to the aircraft; and fly the aircraft at the assigned altitude via commands to fly at the pilotless altitude.

Another embodiment of the present disclosure provides a process for pilotlessly flying, an aircraft certified for flight by a pilot, at a specified altitude. The process may include: setting a fixed barometric pressure in an altimeter in the aircraft, forming a fixed altimeter setting; receiving an assigned altitude for the aircraft to fly; receiving a barometric pressure for a location of the aircraft; determining a differential between a height above mean sea level indicated on an altimeter using the barometric pressure for the location of the aircraft and a height above mean sea level indicated on an altimeter using the fixed altimeter setting; modifying, using the differential, a flight planned altitude for the aircraft, and creating a pilotless altitude; and flying the aircraft at the assigned altitude via directing the aircraft to fly at the pilotless altitude indicating on the altimeter in the aircraft.

Yet another embodiment of the present disclosure may provide a process for changing an altitude flown by an aircraft, certified for flight by a pilot, responsive to a change in barometric pressure, while flying the aircraft pilotlessly while an altimeter setting in the aircraft remains at a fixed altimeter setting. The process may include: setting a fixed barometric pressure in an altimeter in the aircraft, forming the fixed altimeter setting; receiving an assigned altitude for the aircraft to fly; receiving a barometric pressure for a location of the aircraft; receiving a new barometric pressure for the location of the aircraft; determining a differential between a height above mean sea level indicated on an altimeter using the new barometric pressure for the location of the aircraft and a height above mean sea level indicated on an altimeter using the fixed altimeter setting; modifying, using the differential, a flight planned altitude for the aircraft, and creating a pilotless altitude; and flying the aircraft at the assigned altitude, responsive to the change in barometric pressure, via directing the aircraft to fly at the pilotless altitude indicating on the altimeter in the aircraft that remains certified for flight by a pilot.

The features and functions can be achieved independently in various embodiments of the present disclosure or may be combined in yet other embodiments in which further details can be seen with reference to the following description and drawings.

BRIEF DESCRIPTION OF THE DRAWINGS

Novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
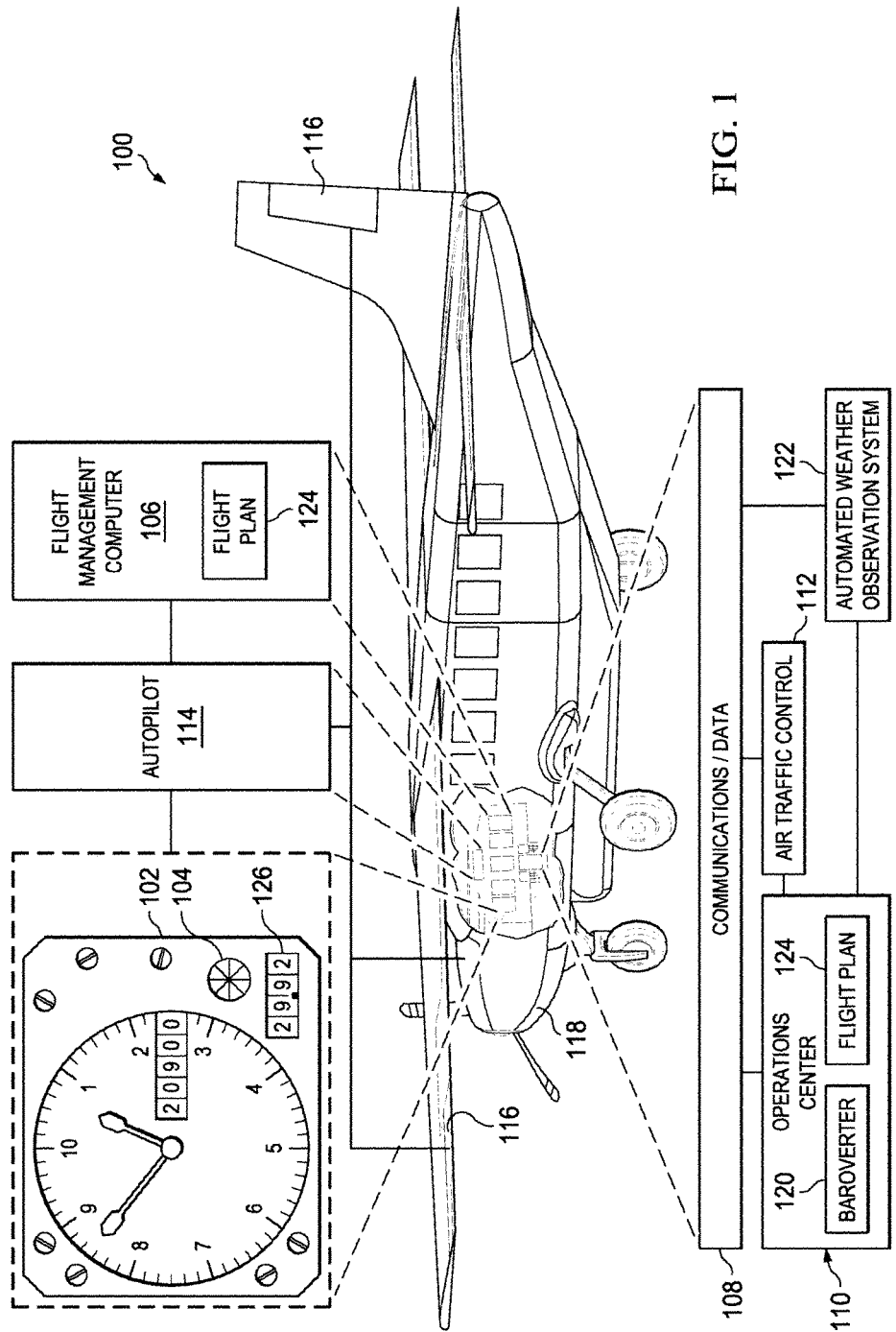
FIG. 1 is an illustration of a perspective view of an aircraft with flight instruments that include an altimeter with a selector for entering a barometric pressure, in accordance with an illustrative embodiment.

The illustrative embodiments recognize and take into account one or more different considerations. Those embodiments recognize and take into account that it would be desirable to be able to fly an aircraft, either with or without a flight crew member on board the aircraft, through a region with changing barometric pressure, and/or across regions with differing barometric pressures.

Further, the illustrative embodiments recognize and take into account that it would be desirable to achieve the technical effects for an aircraft as described above without having to retrofit and/or replace equipment certified on board the aircraft. For example, the illustrative embodiments recognize and take into account that the technical effects of updating computer codes on some of the equipment currently installed in an aircraft currently certified for flight may enable the aircraft to be certified to be flown with or without a flight crew member on board without any mechanical changes made to the equipment currently certified on the aircraft.

The illustrative embodiments provide the technical effects of a process and machine for pilotlessly flying, an aircraft that remains certified for flight by a pilot, at a specified altitude, at least by setting a fixed barometric pressure in an altimeter in the aircraft, forming a fixed altimeter setting. Herein, pilotlessly means without having a flight crew member, able to change the setting of a barometric pressure of an altimeter in the aircraft, on board the aircraft.

The illustrative embodiments provide the technical effects of a process and machine for, when the aircraft is in flight, receiving an assigned altitude for the aircraft to fly and receiving a barometric pressure for a location of the aircraft, and determining a differential between a height above mean sea level indicated on an altimeter using the barometric pressure for the location of the aircraft and a height above mean sea level indicated on an altimeter using the fixed altimeter setting. Further, a system and process are shown for modifying, using the differential, a flight planned altitude for the aircraft, and creating a pilotless altitude, then flying the aircraft at the assigned altitude via directing the aircraft to fly at the pilotless altitude indicating on the altimeter in the aircraft.

For example, the illustrative embodiments recognize and take into account that a computer system containing novel specially programed code may determine the differential between a height above mean sea level indicated on an altimeter using the barometric pressure for the location of the aircraft and a height above mean sea level indicated on an altimeter using the fixed altimeter setting. The computer system containing novel specially programed code may generate a new flight level on a new flight plan and send the new flight plan to the aircraft to help fly the aircraft at an assigned altitude. The technical effect is that by augmenting a currently certified aircraft with a new system and process, an aircraft can fly at an assigned altitude through changing barometric pressure either with or without a flight crew member on board.

With reference now to the figures, and in particular with reference to FIG. 1, an illustration of a perspective view an aircraft with flight instruments that include an altimeter with a selector for entering a barometric pressure is depicted in accordance with an illustrative embodiment.

As depicted, aircraft 100 is certified for flight at least with altimeter 102, flight management computer 106, autopilot 114, flight controls 116, engine 118, and comm 108 in communication at least with ops center 110, ATC 112, and AWOS 122.

Altimeter 102 includes selector 104. Selector 104 is configured such that, in operation, Selector 104 enables entering a barometric pressure setting 126 into altimeter of selector 104. Without limitation, selector 104 may be a mechanical knob, or a digital input device. Without limitation, selector 104 may be twisted or pushed to enter a desired barometric pressure setting 126 into altimeter 102. Barometric pressure setting 126 entered into altimeter 102 may vary depending upon a particular certification for altimeter 102. Barometric pressure setting 126 may be in inches of mercury or hectopascals depending upon the particular one of altimeter 102 certified in the aircraft.

The particular depiction of altimeter 102 in FIG. 1 and subsequent figures is not intending to be limiting, but representative of some altimeter certified for flight on aircraft 100 that receives barometric pressure setting 126 and is certified for use by certified flight management computer 106 and/or autopilot 114. Additionally, the system, machine, and/or process described herein can be adapted to provide the technical benefits for any measurements of barometric pressure that may be required by an altimeter and/or assigned by ATC 112 for use by aircraft 100 for altitude control.

Although shown with a particular form, aircraft 100 may take various forms. As a non-limiting example, aircraft 100 may be selected at least from a group comprising a cargo aircraft, a passenger aircraft, a mixed use aircraft, a jet aircraft, a propeller driven aircraft, a helicopter, a military aircraft, an airplane, a rotorcraft, and/or any platform that may be equipped and/or certified for flight in a controlled airspace, and/or any platform to be controlled for flight at a particular altitude in a region. Without limitation, the region may be airspace controlled by an air traffic control agency. The region may be uncontrolled airspace, a military and/or restricted operating area, and/or international airspace.

As depicted, aircraft 100 may also contain a flight management computer (FMC), shown in this figure as flight management computer 106. Flight management computer 106 may be a part of a flight management system. The flight management system may include flight management computer 106 and autopilot 114 in communication with altimeter 102.

Flight management computer 106 may be physically located within aircraft 100, or may be located outside of aircraft 100 but in communication with aircraft 100 and systems on aircraft 100. Communication may be via a communication system and/or data link system, represented without limitation in FIG. 1 by comm 108, in aircraft 100. Depending upon a specific certification status for aircraft 100, flight management computer 106 may even be located in ops center 110.

Flight management computer 106 is a physical hardware system and includes one or more data processing systems. When more than one data processing system is present, those data processing systems are in communication with each other using a communications medium. The communication medium may be a network. The data processing systems may be selected from at least one of a computer, a server computer, a tablet, or some other suitable type of data processing system.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A, one of item B, and ten of item C; four of item B and seven of item C; or other suitable combinations.

Flight management computer 106 receives and uses flight plan 124. Flight plan 124 may be set of computer codes and/or data loaded generated by baroverter 120 and/or ops center 110 and loaded into flight management computer 106. Flight plan 124 may be loaded into flight management computer 106 by ops center 110, or by a flight crew member. Flight plan 124 in flight management computer 106 may be changed by the flight crew member, or by ops center 110. Flight plan 124 may be changed and/or modified one or more times for and/or during a flight of aircraft 100.

Without limitation, changes and modifications to flight plan 124 may include adding and/or modifying segments of flight plan 124. Without limitation, a segment of flight plan 124 may be a portion of flight plan 124 that directs flight between two waypoints. Without limitation, a waypoint may be a predesignated or created location for navigation to or from, such as without limitation, a point defined by latitude and longitude, and/or latitude, longitude, and an altitude, and/or via Global Positioning System (GPS) and/or Wide Area Augmentation System (WAAS) referenced and/or defined locations. Without limitation, changes and modifications to flight plan 124 may include adding and/or modifying an altitude assigned for each segment of flight plan 124.

Flight management computer 106 may command execution of flight plan 124 by aircraft 100 via control of at least autopilot 114, controlling flight controls 116 and/or engine 118. Flight controls 116 shown in FIG. 1 are merely representative of a flight control system that may communicate with and be controlled by autopilot 114. FIG. 1 does not intend to shown in detail and thereby limit any number and/or type of flight controls 116 that may communicate with and/or be controlled by autopilot 114.

Ops center 110 may be an operations center for an operator of aircraft 100. Ops center 110 may include a processor and/or processing system for generating flight plan 124. Ops center 110 may be in communication with aircraft 100. Ops center 110 may be in communication with aircraft 100 via comm 108. Ops center 110 may also be in communication with an air traffic control (ATC) facility, ATC 112. Ops center 110 may contain or be associated with any equipment required for communications and/or data transfer with at least comm 108, ATC 112, and AWOS 122.

ATC 112 may issue an assigned altitude to aircraft 100. ATC 112 may communicate directly with aircraft 100 or with aircraft 100 through ops center 110. Without limitation, communications of ATC 112 may be verbal, textual, and/or digital.

ATC 112 is shown in FIG. 1 as a single facility in a single location. However, ATC 112 represents any air traffic control facility that may be located at any location that controls an aircraft's (such as without limitation, aircraft 100) flight in a given region. Hence, ATC 112 is representative of any of various air traffic control facilities located in various locations for controlling airspace in various regions.

Ops center 110 may be configured to control loading and/or an update of flight plan 124 into flight management computer 106, such that in operation, ops center 110 may control loading and/or updating flight plan 124 into flight management computer 106. Ops center 110 may control linking data and/or code to and/or from flight management computer 106 via comm 108.

Flight plan 124 in flight management computer 106 may dictate an altitude that aircraft 100 must fly at via communicating with an autopilot (AP), shown without limitation in this figure as autopilot 114, and/or directing autopilot 114. Autopilot 114 commands flight controls, shown without limitation in this figure as flight controls 116, and/or engine 118 to fly the aircraft at an altitude specified in flight plan 124 loaded in flight management computer 106.

Engine 118 is representative of any manner of providing power or thrust for movement of the aircraft. Engine 118 may be representative of one or more engines on the aircraft at any required locations on the aircraft. Thus, engine 118 is not intended to be limited to just a single nose mounted propeller as in the drawing of FIG. 1. Hence, engine 118 may represent any power and/or thrust system and/or autothrottle system that may communicate with and/or be controlled by autopilot 114.

Flight plan 124 may be created by ops center 110 and loaded into flight management computer 106 divided into segments. Each segment of flight plan 124 may represent flight in a specific region of airspace. ATC 112 may assign a specific altitude to be flown in a region of airspace that includes a given segment of flight plan 124. Alternatively, several segments of flight plan 124 may be combined within a single region.

Flight plan 124 loaded into flight management computer 106 may be specially crafted by baroverter 120 in ops center 110 such that for any particular assigned altitude for any particular region of airspace, flight plan 124 will contain (via a process described further below in detail) a segment or segments that transverse the particular region with the assigned altitude coded as the altitude required for the segment or segments that transverse the particular region.

In operations, when an altitude is assigned for flight in a particular region of airspace, a barometric pressure is issued, by the controlling agency for the particular region, for use by aircraft 100 when flying in the particular region in order to maintain aircraft 100 at the altitude, a height above mean sea level, assigned by the controlling agency.

In some embodiments, baroverter 120 could be located in aircraft 100. In some embodiments, flight management computer 106 could incorporate baroverter 120. In some embodiments, baroverter 120 could be a part of or in communication with ops center 110, and communicate and/or control flight management computer 106. In some embodiments, baroverter 120 could be a part of or in communication with a flight planning system that may be contained in or in communication with ops center 110, and communicate and/or control flight management computer 106.

Additionally, autopilot 114 or a remote command system for aircraft 100 may be located in—or in communication with—ops center 110 and control aircraft 100 via comm 108. Further, aircraft 100 may be controlled via comm 108 from ops center 110 by an operator using a read-out of indications on altimeter 102 in aircraft 100. Operator in ops center 110 may control aircraft 100 via controlling flight management computer 106, autopilot 114, and/or flight controls 116 and/or engine 118 based upon indications on altimeter 102 using barometric pressure setting 126 in aircraft 100.

In an illustrative example, ATC 112 sends an assigned altitude and barometric pressure to aircraft 100 for flight in and/or through a specific region of airspace controlled by ATC 112. Without limitation, ATC 112 may receive the barometric pressure from an Automated Weather Observation System (AWOS), shown without limitation in this figure as AWOS 122. AWOS 122 may be representative of an airport weather reporting service, a national weather service, an Integrated Terminal Weather System (ITWS), or any source authorized to provide barometric pressure values for the specific region to ATC 112. AWOS 122 and/or ATC 112 may also provide the barometric pressure to ops center 110.

In an example of an operation of altimeter 102, if a pilot, or any authorized flight crew member, were in aircraft 100, the pilot would enter barometric pressure setting 126 into altimeter 102 via selector 104 and command of aircraft 100—via direct command of flight controls 116, and/or autopilot 114—to maintain the altitude assigned by ATC 112. In the embodiment shown by FIG. 1, aircraft 100 is certified for flight by a pilot. With the technical improvement provided by the machine and process described herein, aircraft 100 would remain certified for flight by a pilot, but aircraft 100 would also be certified for flight without a pilot, or any flight crew member that could change barometric pressure setting 126 in altimeter 102 via selector 104, herein referred to as a pilotless aircraft, where a pilot is not in command of flying the aircraft.

In particular, when baroverter 120 in ops center 110 receives the assigned altitude and barometric pressure for aircraft 100 for flight in a region of airspace, a specially programed code in baroverter 120 generates flight plan 124 for flight management computer 106 that contains segments that transverse the region. Baroverter 120 in ops center 110 then generates a new altitude, the pilotless altitude, from the assigned altitude and barometric pressure for each segment. As referred to herein, a pilotless altitude is a determined altitude setting that is used in operation of a pilotless aircraft, or an aircraft operating on autopilot, or where a pilot is not in command of flying the aircraft to a degree that would enable the pilot to change barometric pressure setting 126 set in altimeter 102 during the flight.

The specially programed code in baroverter 120 is configured such that in operation it creates the new altitude, the pilotless altitude, by referencing a known value for barometric pressure setting 126 that is fixed and in altimeter 102 via selector 104 in aircraft 100, and remains fixed throughout a flight of aircraft 100. The specially programed code in baroverter 120 differentiates the barometric pressure received from ATC 112 and the assigned altitude received from ATC 112 from the known value for barometric pressure setting 126 that is fixed in altimeter 102 via selector 104 in aircraft 100, and remains fixed throughout a flight of aircraft 100. The specially programed code in baroverter 120 determines an indication that will be present on altimeter 102 when aircraft 100 has the barometric pressure setting 126 that is fixed and in altimeter 102 before takeoff of aircraft 100, but aircraft 100 is at the actual height above mean sea level for aircraft 100 intended by the assigned altitude received from ATC 112 for the barometric pressure assigned by ATC 112. Baroverter 120 then codes the indication determined that as being present on altimeter 102 when aircraft 100 has the barometric pressure setting 126 that is fixed and in altimeter 102 before takeoff of aircraft 100, but aircraft 100 is at the actual height above mean sea level for aircraft 100 intended by the assigned altitude received from ATC 112 for the barometric pressure assigned by ATC 112, as the pilotless altitude for each segment using the barometric pressure and assigned altitude.

Baroverter 120 then loads pilotless altitudes determined for each segment into flight plan 124 and sends flight plan 124 to flight management computer 106 to provide commands for autopilot 114, referencing barometric pressure setting 126 set in altimeter 102, to fly aircraft 100 at the pilotless altitude coded into flight management computer 106 via flight plan 124 for the each segment. Each segment of flight plan 124 may have a unique, or a similar pilotless altitude, depending upon the barometric pressure and the assigned altitude for the each segment.

Figure 2:
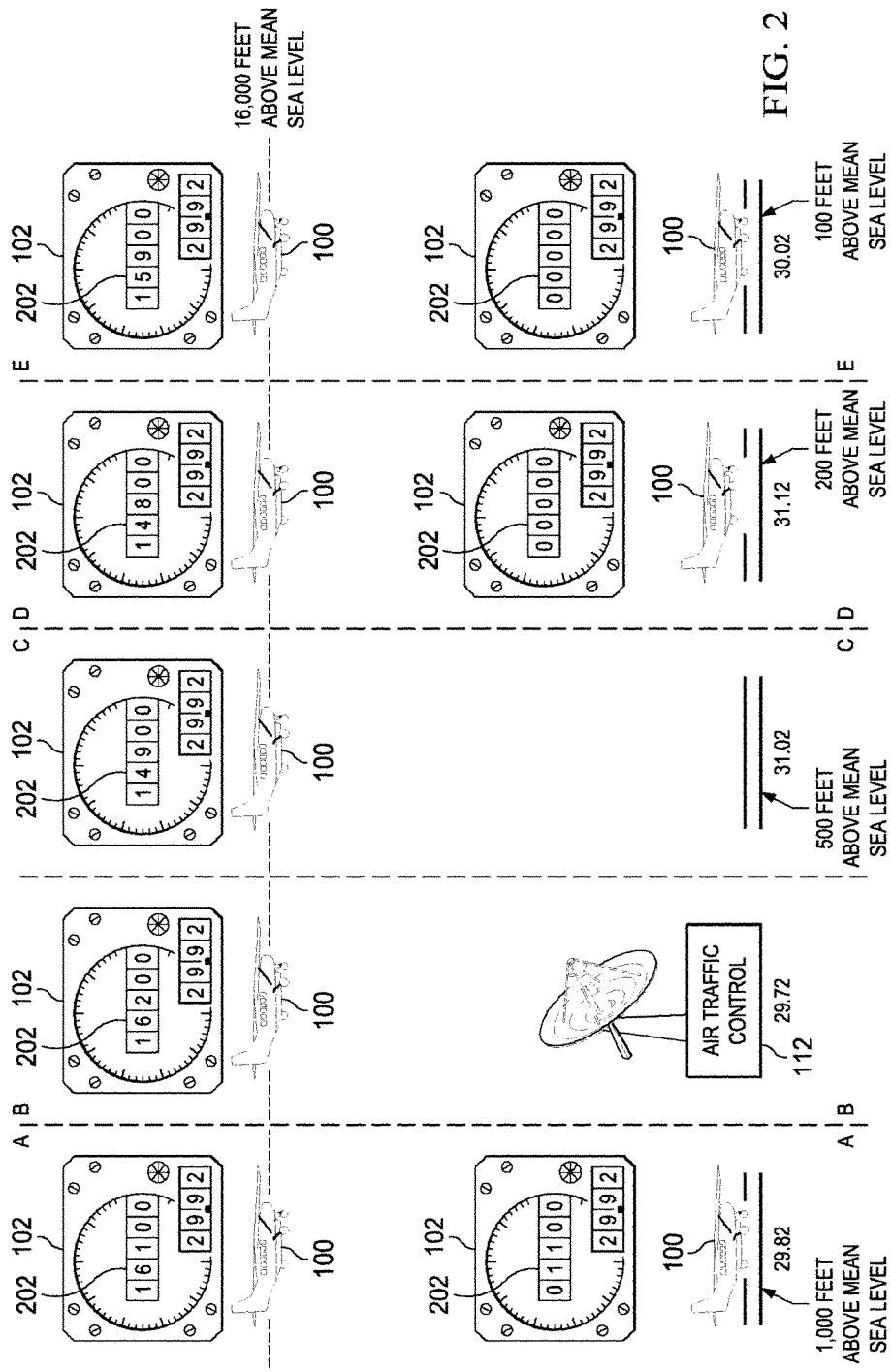
FIG. 2 is an illustration of a side view of a novel machine and process in operation for flying a pilotless aircraft through regions of changing barometric pressure at an assigned altitude, in accordance with an illustrative embodiment.

Turning now to FIG. 2, an illustration of a side view of a novel machine and process in operation for flying a pilotless aircraft through regions of changing barometric pressure at an assigned altitude is depicted in accordance with an illustrative embodiment. In one non-limiting illustrative example, one or more technical solutions are present that overcome a technical problem with controlling altitude for a flight of an aircraft, that remains certified for flight with a pilot on board the aircraft, without a pilot being onboard the aircraft. As a non-limiting example, FIG. 2 shows that aircraft 100 may take-off from an airport in region A, and climb to an altitude of 16,000' above mean sea level (MSL), and maintain that altitude as assigned by ATC 112 until descending to land at an airport in region D, or if bad weather requires, remain at 16,000' MSL until landing at an alternate airport in region E. The altitude of 16,000' MSL is shown as just one example of an altitude that may be assigned for aircraft 100 to fly. The principles and operation shown by FIG. 2 may be applied for any altitude that may be assigned for aircraft 100 to fly above mean seal level by ATC 112.

Although, to simplify and add clarity to the example shown, 16,000' MSL is shown for all regions, a different altitude may be assigned for each segment of flight plan 124. The system, machine, and/or process shown herein may be applied to provide technical solutions for various assigned altitudes and barometric pressures in various regions.

In the non-limiting example, the airport in region A may have a surface that it 1,000' above mean sea level, and a barometric pressure of 29.82 inches of mercury. In this example, barometric pressure setting 126 of 29.92 inches of mercury is set on altimeter 102 in aircraft 100 before takeoff. Hence, indicated altitude 202 in altimeter 102 at takeoff will not be the field elevation of 1,000' MSL, but instead 1,100' MSL. One of ordinary skill in the art will recognize that the system, machine, and/or process described herein can accommodate and will function with any value for barometric pressure setting 126 set before takeoff.

Thus, as a non-limiting example, in operation, baroverter 120 would receive the barometric pressure of 29.82 and the takeoff altitude of 1,000' MSL as depicted in FIG. 2 for region A and generate a pilotless altitude of 1,100' MSL for the first segment, a takeoff segment of the flight. Similarly, with the aircraft assigned an altitude of 16,000' MSL and altimeter 102 retaining indicated altitude 202 at 29.92 while the barometric pressure for region A is 29.82, baroverter 120 would create a segment for flight plan 124 in region A with a pilotless altitude of 16,100' MSL so that aircraft 100 actually flies at the assigned 16,000' above mean sea level via using flight plan 124 in flight management computer 106 directing autopilot 114 using barometric pressure setting 126, and thus controlling flight controls 116 and engine 118.

As shown in FIG. 1, at 16,000' above mean sea level of altimeter 102 shows indicated altitude 202 has changed to 16,100'.

Region B depicts aircraft 100 flying into region B with a barometric pressure of 29.72. A facility for ATC 112 may be located in region B as shown in FIG. 2, or may be located elsewhere. However, region B represents ATC 112 directing aircraft 100 to fly 16,000' above mean sea level while using barometric pressure 29.72. Aircraft 100 cannot change barometric pressure setting 126 in altimeter 102 from 29.92, set before takeoff, to 29.72. However, aircraft 100 is shown flying 16,000' above mean sea level because ops center 110 also received barometric pressure 29.72 for region B. Ops center 110 may have received barometric pressure 29.72 for region B directly or indirectly from ATC 112 or perhaps via AWOS 122.

Baroverter 120 in ops center 110 uses barometric pressure 29.72 for region B to construct a new version of flight plan 124 that contains a segment or segments that traverse region B with a computed pilotless altitude for region B. Based on barometric pressure 29.72 for region B and assigned altitude of 16,000', flight plan 124 creates a pilotless altitude of 16,200' for aircraft 100 to use in region B. Baroverter 120 codes the pilotless altitude of 16,200' into the new version of flight plan 124 for a segments or the segments that transverse region B. If flight plan 124 did not previously have a segment or segments that transverse region B, flight plan 124 may create such segment or segments and modify flight plan 124 by inserting the a segment or segments that transverse region B, each segment having the pilotless altitude coded as the altitude to be flown by aircraft 100 for the each segment in region B.

After baroverter 120 codes the new version of flight plan 124 for region B, ops center 110 transfers flight plan 124 into flight management computer 106 to control flight of aircraft 100 through region B. Flight management computer 106 then commands autopilot 114 using altimeter 102 on aircraft 100 to control flight controls 116 and engine 118 to maintain altitude of aircraft 100 at 16,000' above mean sea level, as assigned by ATC 112, by keeping pilotless altitude of 16,200' indicated on altimeter 102 with barometric pressure setting 126 set to 29.92 inches.

Likewise, for region C, aircraft 100 may be flying past airport C, which may be, as shown without limitation in FIG. 2, located 500' above mean seal level, that reports a barometric pressure of 31.02 inches of mercury for use by ATC 112 to assign for use by aircraft 100. Baroverter 120 receives the reported barometric pressure of 31.02 inches for region C, ensures that flight plan 124 has segments that transverse region C and creates a new pilotless altitude of 14,900' MSL for the segments of region C and codes them into flight plan 124. After baroverter 120 codes the new version of flight plan 124 for region C, ops center 110 transfers flight plan 124 into flight management computer 106 to control flight of aircraft 100 through region C. Flight management computer 106 then commands autopilot 114 using altimeter 102 on aircraft 100 to control flight controls 116 and engine 118 to maintain aircraft 100 altitude at 16,000' above mean sea level, as assigned by ATC 112, by keeping pilotless altitude of 14,900' MSL indicated on altimeter 102 with barometric pressure setting 126 set to 29.92 inches.

As aircraft 100 enters region D to land at airport D with a runway located 1,200' above mean sea level with a barometric pressure of 31.12 inches, baroverter 120 receives the reported barometric pressure of 31.12 inches for region D, ensures that flight plan 124 has segments that transverse region D and creates a new pilotless altitude of 14,800' MSL for the segments of region C and codes them into flight plan 124. After baroverter 120 codes the new version of flight plan 124 for region C, ops center 110 transfers flight plan 124 into flight management computer 106 to control flight of aircraft 100 through region C. Flight management computer 106 then commands autopilot 114 using altimeter 102 on aircraft 100 to control flight controls 116 and engine 118 to maintain aircraft 100 altitude at 16,000' above mean sea level, as assigned by ATC 112, by keeping pilotless altitude of 14,800' indicated on altimeter 102 with barometric pressure setting 126 set to 29.92 inches.

Additionally, flight plan 124 may have segments that bring aircraft 100 down to land at a destination in region D, airport D. At landing, with a barometric pressure at airport D being 31.12, altimeter 102 will read 00,000'. Hence, baroverter 120 would create a new pilotless altitude of 00,000' for the segment of flight plan 124 that brings aircraft 100 in to land at airport D.

Similarly, (but not shown) as a further non-limiting example, if the final segment of flight plan 124 were linked to some coupled approach that guides aircraft 100 into landing, and the coupled approach begins, as a non-limiting example, at an altitude of 3,000' above mean sea level, then baroverter 120 would create a segment, in flight plan 124, that leads to and joins the beginning of the coupled approach with a pilotless altitude of 1,800', which would be indicated on altimeter 102 as aircraft 100 joins the coupled approach in region D at 3,000' above mean sea level.

In further illustrative example, technical solutions are present that overcome a technical problem for flying an aircraft, that remains certified for flight by a pilot, without a pilot, where for some reason aircraft 100 is unable to land at airport D in region D, and must continue on to an alternate airport, airport E in region E. Flight plan 124 may already contain a segment or segments to fly from region D to airport E in region E. Flight plan 124 may generate a segment or segments to fly from region D to airport E in region E. Baroverter 120 will receive a barometric pressure and assigned altitude for aircraft 100 to use in region E.

As a non-limiting example, aircraft 100 is assigned 16,000' above mean sea level as the altitude to fly in region E using a barometric pressure of 30.02 inches. 29.92 remains set in flight plan 124 in altimeter 102 in aircraft 100. Hence, baroverter 120 will create a new pilotless altitude of 15,900', and code the new pilotless altitude of 15,900' into segments of flight plan 124 for flight at the assigned altitude of 16,000' above mean sea level in region E.

As aircraft 100 prepares to land at airport E, baroverter 120 will create a new pilotless altitude of 00,000' for the flight plan 124 segment that brings aircraft 100 into land at airport E.

Similarly, (but not shown) as a further non-limiting example, if the final segment of flight plan 124 were linked to some coupled approach that guides aircraft 100 into landing and the coupled approach begins, as a non-limiting example, at an altitude of 3,000' above mean sea level, then baroverter 120 would create a segment in flight plan 124 that leads to and joins the beginning of the coupled approach with a pilotless altitude of 2,900', which would be indicated on altimeter 102 as aircraft 100 joins the coupled approach in region E at 3,000' above mean sea level.

Hence, the illustrative examples show that one or more technical solutions are present that overcome a technical problem with the amount of resources needed for flying an aircraft, that remains certified for flight by a pilot, without a pilot on board the aircraft. Baroverter 120 provides a machine and process for recoding flight plan 124 used by flight management computer 106 to guide aircraft 100 to maintain an assigned altitude with an assigned barometric pressure despite altimeter 102 in aircraft 100 retaining a single preset of flight plan 124.

Baroverter 120 may be implemented in software, hardware, firmware, or a combination thereof. When software is used, the operations performed by baroverter 120 may be implemented in program code specially configured to run on hardware, such as a processor unit. When firmware is used, the operations performed by baroverter 120 may be implemented in program code and data, and stored in persistent memory to run on a processor unit. When hardware is employed, the hardware may include circuits that operate to perform the operations in baroverter 120.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable types of hardware devices.

As a result, when baroverter 120 operates, which may be within or part of systems of ops center 110, baroverter 120 and/or ops center 110 operates as a special purpose computer system in which baroverter 120 enables creating new pilotless altitudes for new and/or existing segments within flight plan 124. In particular, baroverter 120 transforms flight plan 124 by acting as a special purpose computer system as compared to currently available general computer systems that do not have specially coded programing configured in baroverter 120.

As used herein, the terms "computer system," "comparator," "manager," "component," or "module" may include a hardware and/or software system that operates to perform one or more functions. For example, the comparator, manager, module, component, or system may include a computer processor, controller, or other logic-based device that performs operations based on instructions stored on a tangible and non-transitory computer readable storage medium, such as a computer memory. Alternatively, the comparator, manager, module, component, or system may include a hardwired device that performs operations based on hard-wired logic of the device. The flowcharts, modules, or components shown in the attached figures may represent the hardware that operates based on software instructions and hardware logic, the software that directs hardware to perform the operations, or a combination thereof.

Figure 3:
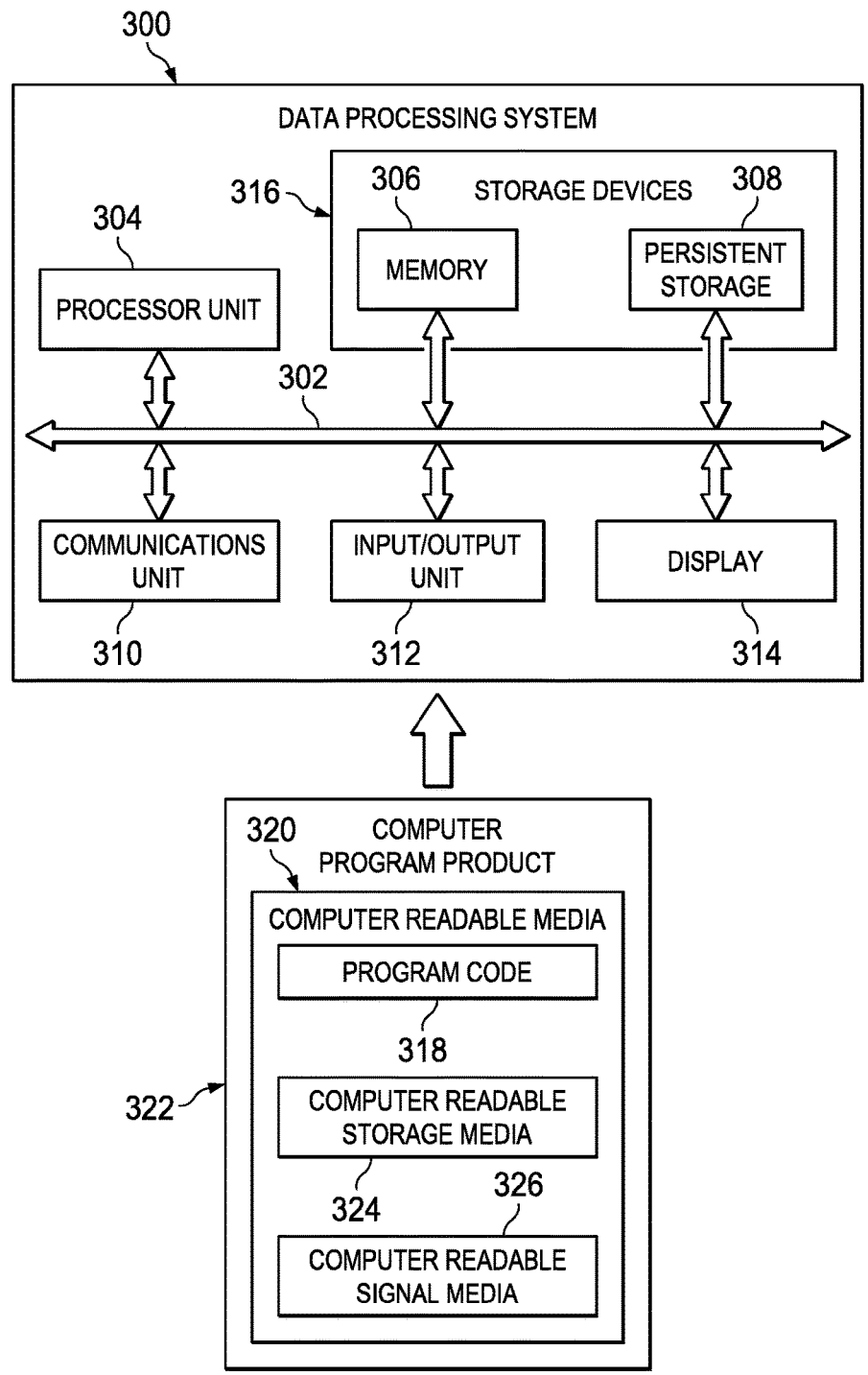
FIG. 3 is an illustration of a block diagram of a data processing system, in accordance with an illustrative embodiment.

Turning now to FIG. 3, an illustration of a block diagram of a data processing system is depicted in accordance with an illustrative embodiment. Data processing system 300 may be representative of implementations of computer systems used by ops center 110 and/or baroverter 120. In this illustrative example, data processing system 300 includes communications framework 302, which provides communications between processor unit 304, memory 306, persistent storage 308, communications unit 310, input/output unit 312, and display 314. In this example, communications framework 302 may take the form of a bus system.

Processor unit 304 serves to execute instructions for software that may be loaded into memory 306. Processor unit 304 may be a number of processors, a multi-processor core, or some other type of processor, depending on the particular implementation.

Memory 306 and persistent storage 308 are examples of storage devices 316. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 316 may also be referred to as computer-readable storage devices in these illustrative examples. Memory 306, in these examples, may be, for example, a random access memory or any other suitable volatile or non-volatile storage device. In some illustrative examples, memory 306 may be persistent storage 308.

Persistent storage 308 may take various forms, depending on the particular implementation. For example, persistent storage 308 may contain one or more components or devices. For example, persistent storage 308 may be a hard drive, a solid state hard drive, a flash memory, a rewritable optical disk, a rewritable magnetic tape, or some combination of the above. The media used by persistent storage 308 also may be removable. For example, a removable hard drive may be used for persistent storage 308.

Communications unit 310, in these illustrative examples, provides for communications with other data processing systems or devices. In these illustrative examples, communications unit 310 may be or include a network interface card.

Input/output unit 312 allows for input and output of data with other devices that may be connected to data processing system 300. For example, input/output unit 312 may provide a connection for user input through at least one of a keyboard, a mouse, or some other suitable input device. Further, input/output unit 312 may send output to a printer. Display 314 provides a mechanism to display information to a user.

Instructions for at least one of the operating system, applications, or programs may be located in storage devices 316, which are in communication with processor unit 304 through communications framework 302. The processes of the different embodiments may be performed by processor unit 304 using computer-implemented instructions, which may be located in a memory, such as memory 306.

These instructions are referred to as program code, computer-usable program code, or computer-readable program code that may be read and executed by a processor in processor unit 304. The program code in the different embodiments may be embodied on different physical or computer-readable storage media, such as memory 306 or persistent storage 308.

Program code 318 is located in a functional form on computer-readable media 320 that is selectively removable and may be loaded onto or transferred to data processing system 300 for execution by processor unit 304. Program code 318 and computer-readable media 320 form computer program product 322 in these illustrative examples. In one example, computer-readable media 320 may be computer-readable storage media 324 or computer-readable signal media 326.

In these illustrative examples, computer-readable storage media 324 is a physical or tangible storage device used to store program code 318 rather than a medium that propagates or transmits program code 318.

Alternatively, program code 318 may be transferred to data processing system 300 using computer-readable signal media 326. Computer-readable signal media 326 may be, for example, a propagated data signal containing program code 318. For example, computer-readable signal media 326 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 300 are not meant to provide architectural limitations to the manner in which different embodiments may be implemented. The different illustrative embodiments may be implemented in a data processing system including components, in addition to or in place of those illustrated, for data processing system 300. Other components shown in FIG. 3 can be varied from the illustrative examples shown. The different embodiments may be implemented using any hardware device or system capable of running program code 318.

Figure 4:
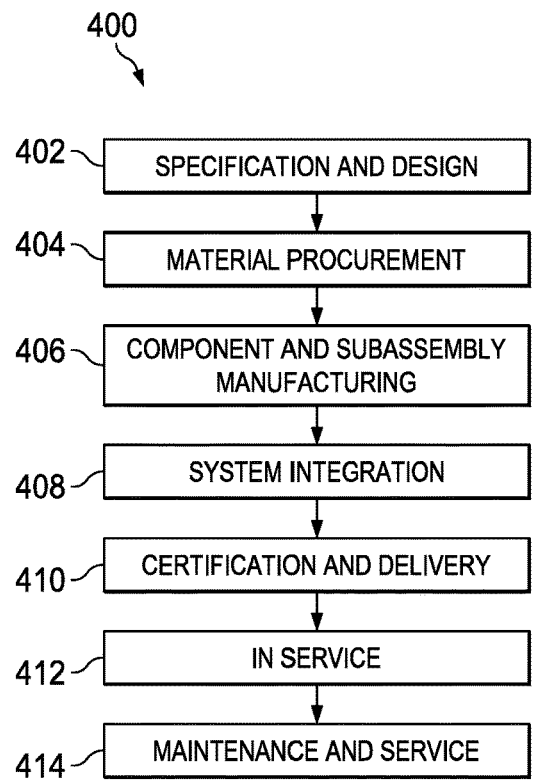
FIG. 4 is an illustration of a block diagram of an aircraft manufacturing and service method, in accordance with an illustrative embodiment.
Figure 5:
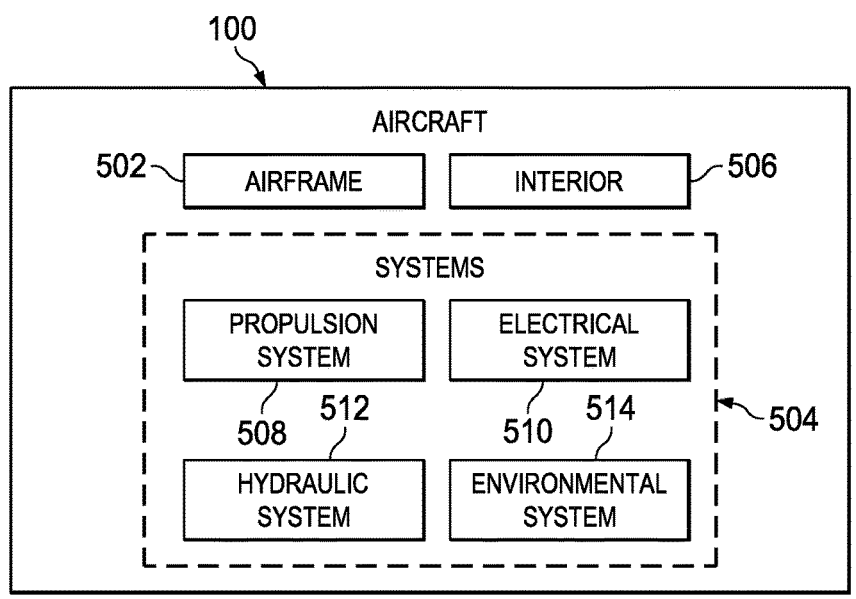
FIG. 5 is an illustration of a block diagram of an aircraft in which an illustrative embodiment may be implemented.

Illustrative embodiments of the disclosure may be described in the context of aircraft manufacturing and service method 400 as shown in FIG. 4 and aircraft 100 as shown in FIG. 5. Turning first to FIG. 4, an illustration of a block diagram of an aircraft manufacturing and service method is depicted in accordance with an illustrative embodiment. During pre-production, aircraft manufacturing and service method 400 may include specification and design 402 of aircraft 100 in FIG. 5 and material procurement 404.

During production, component and subassembly manufacturing 406 and system integration 408 of aircraft 100 in FIG. 5 takes place. Thereafter, aircraft 100 in FIG. 5 may go through certification and delivery 410 in order to be placed in service 44. While in service 44 by a customer, aircraft 100 in FIG. 5 is scheduled for routine maintenance and service 414, which may include modification, reconfiguration, refurbishment, or other maintenance and service.

Each of the processes of aircraft manufacturing and service method 400 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 5, an illustration of a block diagram of an aircraft is depicted in which an illustrative embodiment may be implemented. In this example, aircraft 100 is produced by aircraft manufacturing and service method 400 in FIG. 4 and may include airframe 502 with plurality of systems 504 and interior 506. Examples of systems 504 include one or more of propulsion system 508, electrical system 510, hydraulic system 512, and environmental system 514. Any number of other systems may be included. Although an aircraft example is shown, different illustrative embodiments may be applied to other platforms for flight at an assigned altitude.

Apparatuses and methods embodied herein may be employed during at least one of the stages of aircraft manufacturing and service method 400 in FIG. 4. For example, baroverter 120 in FIG. 1 may be incorporated into different configurations within aircraft 100 during specification and design 402 of aircraft 100, component and subassembly manufacturing 406, and system integration 408. As another example, baroverter 120 may be integrated without limitation, into different configurations of a flight control, an autopilot, and/or a flight management computer on aircraft 100 during routine maintenance and service 414. For example, incorporations of baroverter 120 integrated within aircraft 100 may be used to plan or implement work orders for modification, reconfiguration, refurbishment, or other maintenance and service for aircraft 100.

The use of a number of the different illustrative embodiments may substantially expedite the assembly of aircraft 100, reduce the cost of aircraft 100, or both expedite the assembly of aircraft 100 and reduce the cost of aircraft 100. The reduction in cost may be realized through reduced use of resources such as by allowing an aircraft certified for flight with a pilot, to be flown without a pilot, by using baroverter 120, enables using an existing altimeter 102 certified in aircraft 100, an existing flight management computer 106 certified in aircraft 100 and existing autopilot 114 certified in aircraft 100 without any changes to equipment on aircraft 100.

Figure 6:
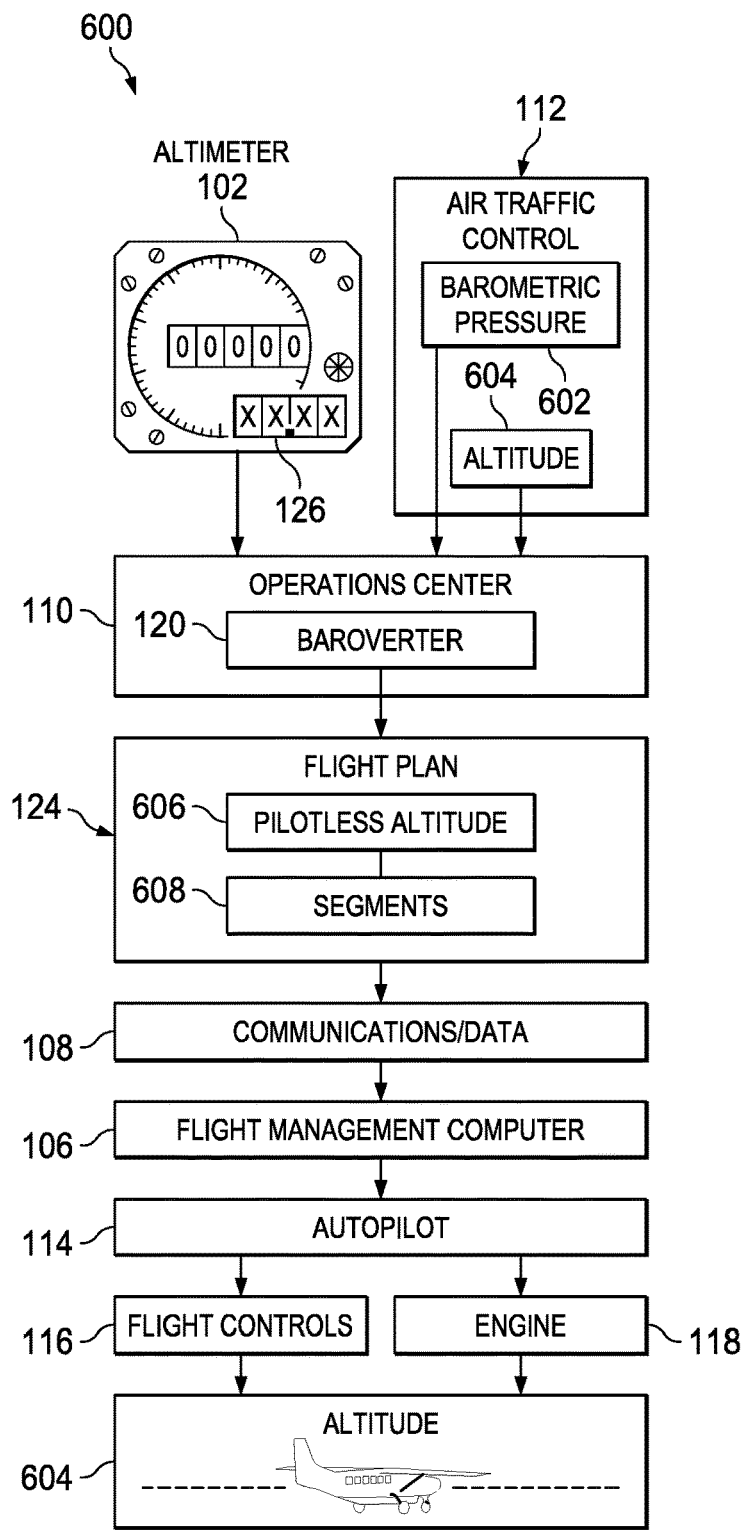
FIG. 6 is an illustration of a high-level flowchart for a baroverter process, in accordance with an illustrative embodiment.

Turning now to FIG. 6, an illustration of a high-level flowchart for a baroverter process is depicted, in accordance with an illustrative embodiment. As shown, baroverter process 600 includes baroverter 120 in ops center 110 receiving barometric pressure 602 setting 126 as set in altimeter 102. As mentioned above, alternatively baroverter 120 may be located in aircraft 100, and/or in an upgraded flight management computer 106. Baroverter 120 also receives directly or indirectly, from ATC 112, barometric pressure 602 and altitude 604 assigned to aircraft 100 for flight. Altitude 604 and barometric pressure 602 therefore may also be referred to as "assigned" barometric pressure 602 and "assigned" altitude 604.

Specially programed code in baroverter 120 then produces pilotless altitude 606 for each segment of segments 608 of flight plan 124 and transforms flight plan 124 into a new version of flight plan 124 that includes pilotless altitude 606. Each segment is given its own pilotless altitude 606. Pilotless altitude 606 for each segment in flight plan 124 may be a different from pilotless altitude 606 from each other segment in flight plan 124, or may be equal for some or for all segments of flight plan 124. As mentioned above, baroverter 120 may also transform a previously existing flight plan 124 by adding one or more segments into flight plan 124, or by modifying waypoint coordinates and/or altitudes defining existing segments 608 in flight plan 124.

Flight plan 124 is then transferred, possibly via comm 108, to flight management computer 106. Flight management computer 106 then commands autopilot 114 to command flight controls 116 and engine 118 to fly aircraft 100 at assigned altitude 604. Thus, in practice, the system and machine shown for baroverter 120 above provides at least for a process for pilotlessly flying an aircraft, which remains certified for flight by a pilot at a specified one of assigned altitude 604.

Hence, FIG. 6 exemplifies at least a machine that includes a computer code specially programmed on a non-transitory medium to change an altitude of an aircraft, certified for flight by a pilot, including an altimeter including a fixed altimeter setting. The computer code may be configured to: receive an assigned altitude for the aircraft to fly; receive a barometric pressure for a location of the aircraft; receive a new barometric pressure for the location of the aircraft; determine a differential between a height above mean sea level indicated on an altimeter using the new barometric pressure for the location of the aircraft and a height above mean sea level indicated on an altimeter based upon the fixed altimeter setting; modify, based upon the differential, a flight planned altitude for the aircraft to create a pilotless altitude; send the pilotless altitude to the aircraft; and thus facilitate for flying the aircraft at the assigned altitude via commands to fly the aircraft at the pilotless altitude. The commands may be coded into a new one of flight plan 124 sent to flight management computer 106 previously certified and unchanged—other than receiving a new flight plan—from flight management computer 106 configuration used for flying the aircraft by a flight crew member. The commands may be executed by autopilot 114 controlled by and/or in communication with flight management computer 106.

The machine described above, may also send the pilotless altitude to a flight management system for an aircraft, such that the flight management system directs a flight control system for the aircraft configured to receive the height above mean sea level indicated on the altimeter comprising the fixed altimeter setting. Thereby, the machine provides a technical effect that enables a novel process for pilotlessly flying, an aircraft that remains certified for flight by a pilot, at a specified altitude.

Figure 7:
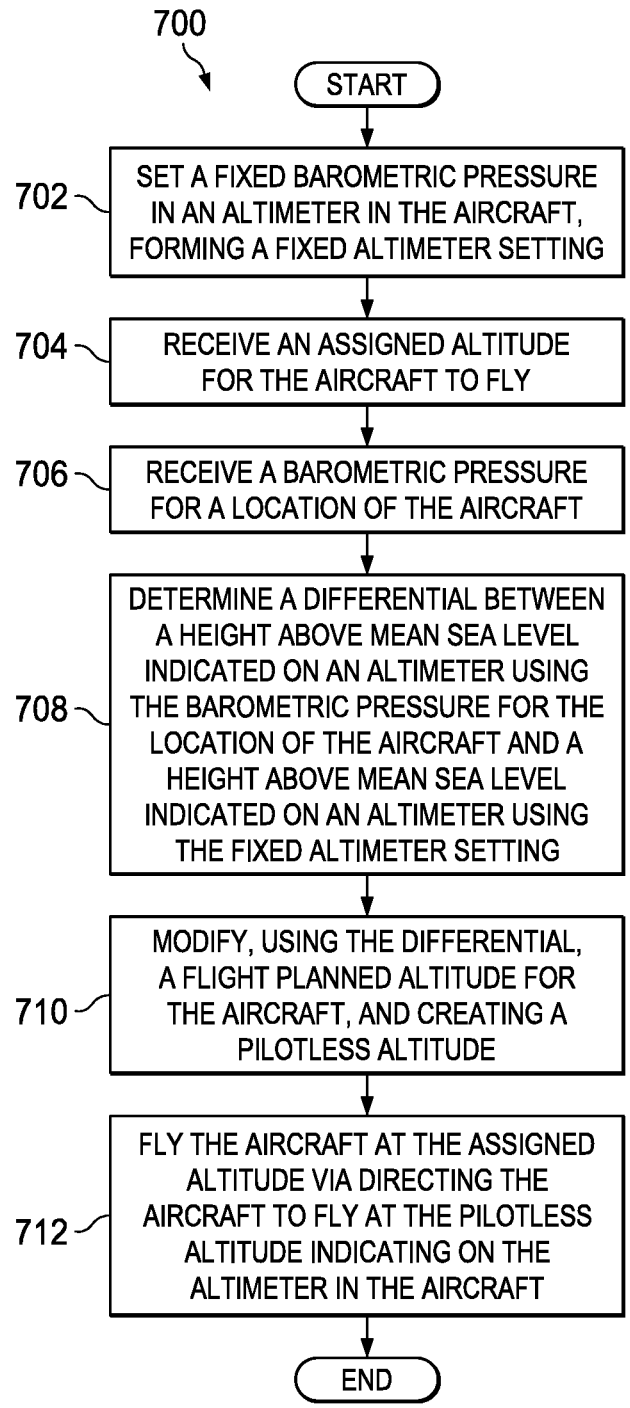
FIG. 7 is an illustration of a flowchart of a process for pilotlessly flying, an aircraft that remains certified for flight by a pilot, at a specified altitude, in accordance with an illustrative embodiment.

Turning now to FIG. 7, an illustration of a flowchart of for a process for pilotlessly flying, an aircraft that remains certified for flight by a pilot, at a specified altitude, is depicted in accordance with an illustrative embodiment. Specifically, process 700 may begin with setting a fixed barometric pressure in an altimeter in the aircraft, forming a fixed altimeter setting (operation 702). The aircraft may be certified for flight by a pilot and comprise an altimeter configured to receive the fixed barometric pressure from an input via a selector on the altimeter. The selector may be a barometric pressure setting knob.

Process 700 may continue with receiving an assigned altitude for the aircraft to fly (operation 704), and receiving a barometric pressure for a location of the aircraft (operation 706).

Receiving the assigned altitude may occur for a region of airspace. The aircraft may be within the region of airspace. The assigned altitude may be received as part of an air traffic control clearance requiring the aircraft to fly the aircraft at the assigned altitude. Receiving the assigned altitude for the aircraft to fly and the barometric pressure for the location of the aircraft may be in an operations center, and/or in a computer in the operations center. Receiving a new barometric pressure for a location of the aircraft may include receiving a new barometric pressure for each new region the aircraft enters.

Process 700 may continue by determining a differential between a height above mean sea level indicated on an altimeter using the barometric pressure for the location of the aircraft and a height above mean sea level indicated on an altimeter using the fixed altimeter setting (operation 708).

Process 700 may continue by modifying, using the differential, a flight planned altitude for the aircraft, and creating a pilotless altitude (operation 710). The pilotless altitude may be further modified by a new pilotless altitude created for each new region the aircraft enters.

Process 700 may continue by flying the aircraft at the assigned altitude via directing the aircraft to fly at the pilotless altitude indicating on the altimeter in the aircraft (operation 712). Directing may be accomplished by the operations center sending the pilotless altitude to the aircraft via updating a flight plan in a flight management system for the aircraft for at least a region comprising the location of the aircraft. Directing may be accomplished by the aircraft to fly at the pilotless altitude via a flight control system receiving a height above mean sea level input from the altimeter in the aircraft. Directing may be accomplished by directing the aircraft to fly at the pilotless altitude via a flight control system receiving a height above mean sea level input from the altimeter in the aircraft.

Figure 8:
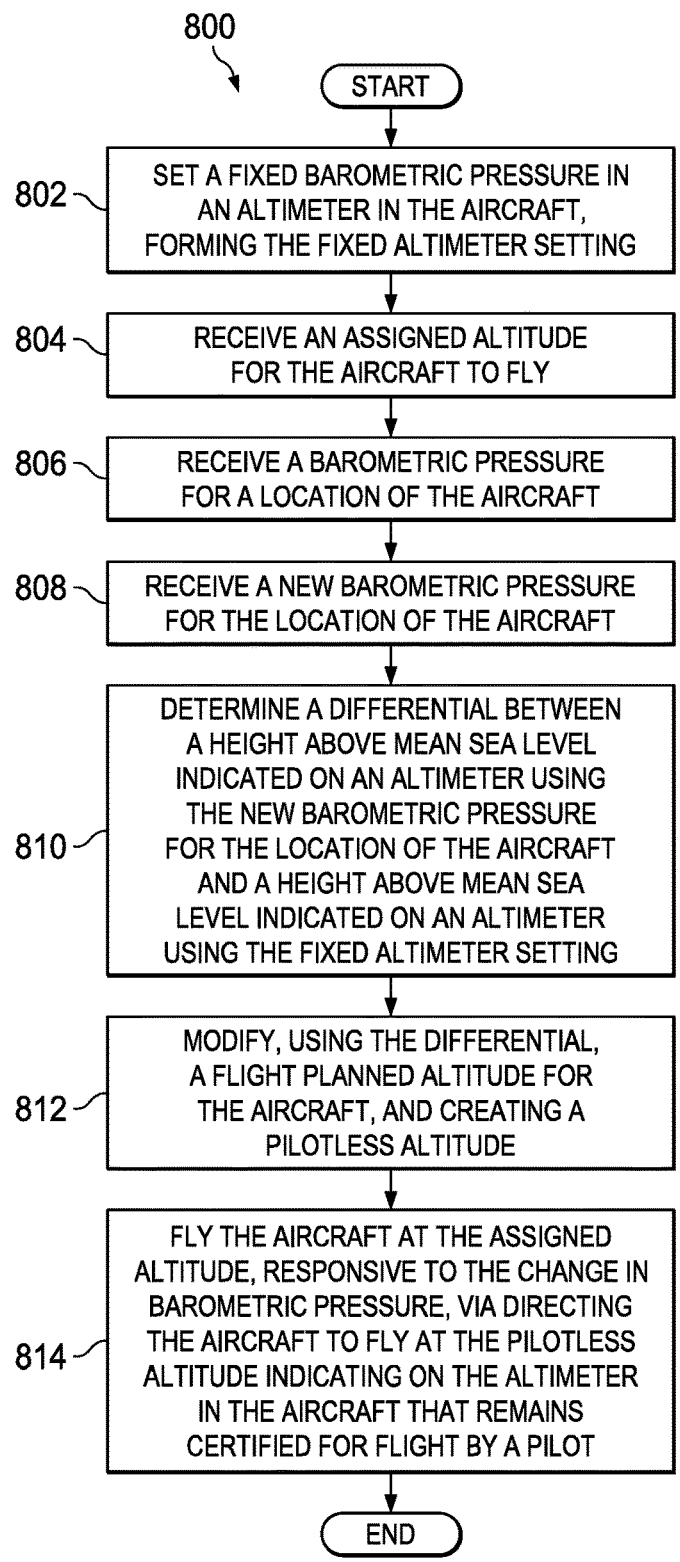
FIG. 8 is an illustration of a flowchart of a process for changing an altitude flown, by an aircraft that remains certified for flight by a pilot, responsive to a change in barometric pressure, in accordance with an illustrative embodiment.

Turning now to FIG. 8 an illustration of a flowchart of for a process for changing an altitude flown, by an aircraft that remains certified for flight by a pilot, responsive to a change in barometric pressure is depicted in accordance with an illustrative embodiment. Specifically process 800 is for certified for flight by a pilot, responsive to a change in barometric pressure, while flying the aircraft pilotlessly while an altimeter setting in the aircraft comprises a fixed altimeter setting.

Process 800 may begin by setting a fixed barometric pressure in an altimeter in the aircraft, forming the fixed altimeter setting (operation 802). Process 800 may continue by receiving an assigned altitude for the aircraft to fly (operation 804). Process 800 may continue by receiving a barometric pressure for a location of the aircraft (operation 806).

Process 800 may continue by receiving a new barometric pressure for the location of the aircraft (operation 808). Receiving the assigned altitude may occur for a region of airspace. The aircraft may be within the region of airspace. The assigned altitude may be received as part of an air traffic control clearance requiring the aircraft to fly the aircraft at the assigned altitude. Receiving the assigned altitude for the aircraft to fly and the barometric pressure for the location of the aircraft may be in an operations center, and/or in a computer in the operations center. Receiving a new barometric pressure for a location of the aircraft may include receiving a new barometric pressure for each new region the aircraft enters. Receiving the new barometric pressure may apply to an air traffic control clearance for a region of space in which the aircraft is located.

Process 800 may continue by determining a differential between a height above mean sea level indicated on an altimeter using the new barometric pressure for the location of the aircraft and a height above mean sea level indicated on an altimeter using the fixed altimeter setting (operation 810).

Process 800 may continue by modifying, using the differential, a flight planned altitude for the aircraft, and creating a pilotless altitude (operation 812). Creating the pilotless altitude and sending the pilotless altitude to the aircraft may occur in and from an operations center receiving communications from air traffic control. The communications from air traffic control may be at least one of: verbal and automated.

Process 800 may continue by flying the aircraft at the assigned altitude, responsive to the change in barometric pressure, via directing the aircraft to fly at the pilotless altitude indicating on the altimeter in the aircraft that remains certified for flight by a pilot (operation 814).

Figure 9:
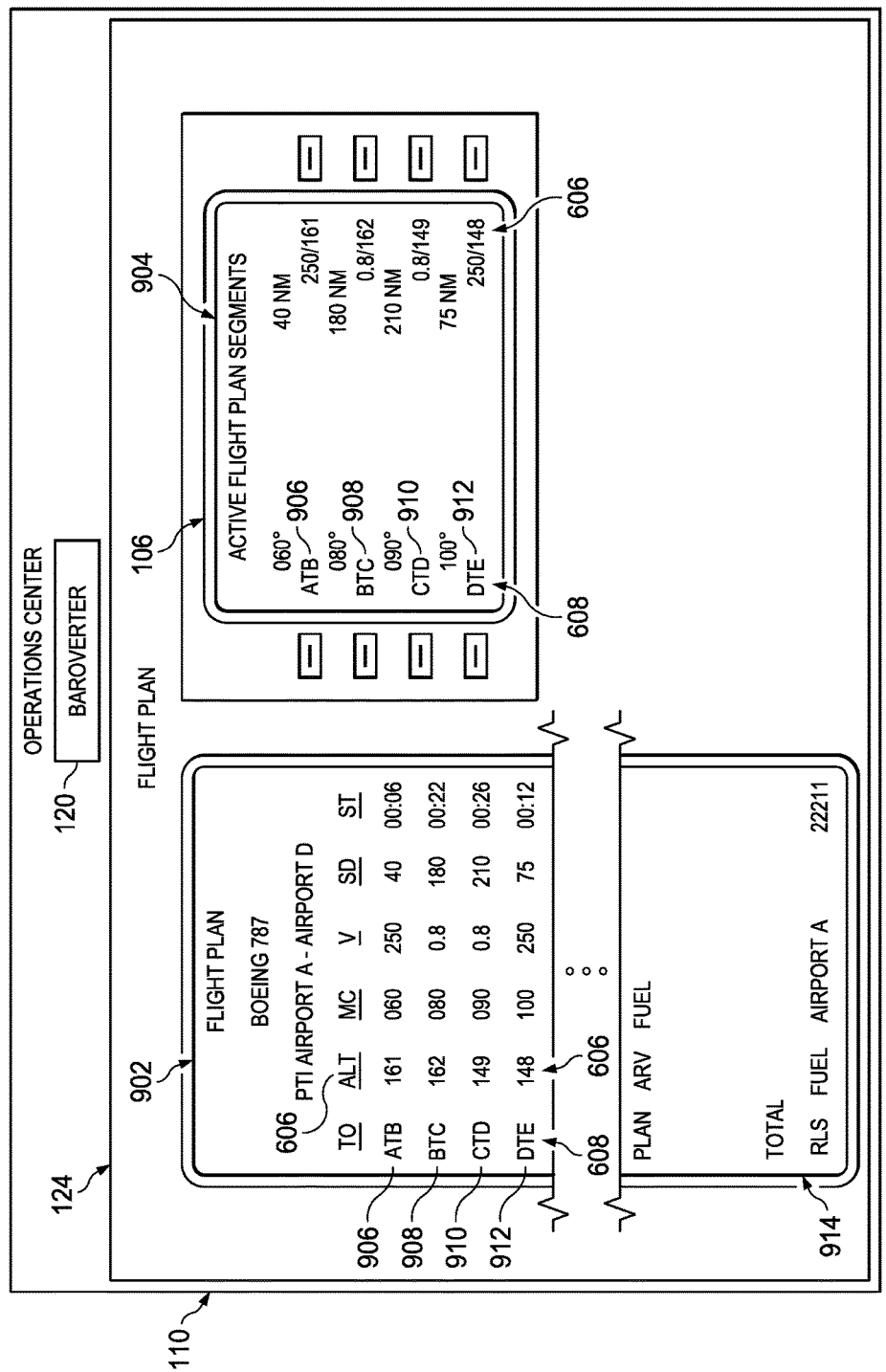
FIG. 9 is an illustration of a flight plan generated for a flight management computer of a pilotless aircraft, in accordance with an illustrative embodiment.

Turning now to FIG. 9, an illustration of a flight plan generated for a flight management computer of a pilotless aircraft is depicted in accordance with an illustrative embodiment. FIG. 9 is provided to aid a visualization of coding that may be provided to a flight management computer by a baroverter that may be in an operations control center.

More specifically, baroverter 120 produces pilotless altitude 606 that is used by flight plan 124 to direct the indicated altitude 202 flown for each of segments 608 that make up flight plan 124. As shown in FIG. 9, flight plan 124 may be visualized as a table 902 that could be shown on a display and/or printed on a sheet for reading. Additionally, flight plan 124 as received by flight management computer 106 may be visualized as presented in a control display unit 904 of and/or in communication with flight management computer 106.

Hence, ops center 110 may generate flight plan 124, and flight planned altitudes within flight plan 124. When an operator plans to fly aircraft 100 with a pilot on board aircraft 100, ops center 110 receives that selection, baroverter 120 will not be activated, and a flight planned altitude generated by ops center 110 for and/or shown in flight plan 124 will not be pilotless altitude 606. When an operator plans to fly aircraft 100 without changing barometric pressure setting 126 in altimeter 102 in aircraft 100, ops center 110 receives that selection, baroverter 120 is activated, and a flight planned altitude generated by ops center 110 for and/or shown in flight plan 124 will be pilotless altitude 606.

Thus, as shown in FIG. 9, segments 608 may include segment 906, segment 908, segment 910, and segment 912. Without limitation, segment 906 may be visualized as representing a course for aircraft 100 to fly through region A as shown in FIG. 2 to a point represented by the dashed line that separates region A and region B in FIG. 2 and designated as fix ATB in table 902 and in control display unit 904. Without limitation, segment 908 may be visualized as representing a course for aircraft 100 to fly through region B as shown in FIG. 2 to a point represented by the dashed line that separates region B and region C in FIG. 2 and designated as fix BTC in table 902 and in control display unit 904. Without limitation, segment 910 may be visualized as representing a course for aircraft 100 to fly through region C as shown in FIG. 2 to a point represented by the dashed line that separates region C and region D in FIG. 2 and designated as fix CTD in table 902 and in control display unit 904. Without limitation, segment 912 may be visualized as representing a course for aircraft 100 to fly through region D as shown in FIG. 2 to a point represented by the dashed line that separates region D and region E in FIG. 2 and designated as fix DTE in table 902 and in control display unit 904.

Without limitation, other columns in table 902 may indicate: a magnetic course (MC), such as, without limitation, 060° or 100°; a velocity (V) shown, without limitation, in knots, such as, without limitation, 250, or Mach, such as, without limitation, 0.8; a segment distance (SD), a segment time (ST), and other information that may be generated as a part of flight plan 124, such as, without limitation, fuel planning information 914.

One of ordinary skill in the art understands that, without limitation, segment 912 might alternatively represent a course for aircraft 100 to fly in region D of FIG. 2 to a point that begins a descent segment to a point from which aircraft 100 may fly an approach into a runway at an airport in region D. Additionally, one of ordinary skill in the art will recognize that some manufactures may refer to segments 608 alternatively as legs.

One of ordinary skill in the art understands that flight plan 124 may contain more segments 608 than are shown in FIG. 9, or that may be shown at one time on any one page for table 902 or on control display unit 904 or any one page of control display unit 904. However, baroverter 120 determines and codes pilotless altitude 606 for each of segments 608 into flight plan 124 for loading into flight management computer 106.

As noted above, baroverter 120 may be located in ops center 110 and may communicate with flight plan 124 that may be generated by ops center 110 that may communicate with flight management computer 106 in aircraft 100.

Alternatively, baroverter 120 may be located in flight management computer 106. Additionally, flight management computer 106 may be located in ops center 110 that may be in communication with aircraft 100 and thus autopilot 114.

As shown in FIG. 9, each of segments 608 in table 902 and/or on control display unit 904 have a pilotless altitude 606 determined and indicated for the each segment in segments 608 illustrated as part of flight plan 124. In both table 902 and control display unit 904, the pilotless altitude is represented by three digits that represent altitude in hundreds of feet, such that, for segment 906 to fix ATB, pilotless altitude 606 indicated as 161 signifies that aircraft 100 should be flown such that indicated altitude 202 shows as 16,100' MSL on altimeter 102, as illustrated in FIG. 2 while aircraft 100 flies in region A to fix ATB. Likewise, for segment 908 to fix BTC, pilotless altitude 606 indicated as 161 signifies that aircraft 100 should be flown such that indicated altitude 202 shows as 16,200' MSL on altimeter 102, as illustrated in FIG. 2 while aircraft 100 flies in region B from fix ATB to fix BTC.

The illustration of baroverter 120 of FIG. 1 and the different components in FIGS. 1-9 are not meant to imply physical or architectural limitations to the manner in which an illustrative embodiment may be implemented. Other components, in addition to or in place of the ones illustrated, may be used. Some components may be unnecessary. Also, the blocks are presented to illustrate some functional components. One or more of these blocks may be combined, divided, or combined and divided into different blocks when implemented in an illustrative embodiment.

The flowcharts and diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware.

When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The illustrative embodiments provide one or more technical solutions to technical problems with flying, an aircraft that remains certified for flight by a pilot, without a pilot on board the aircraft. Herein, pilot may also refer to a certified flight crew member on board to enter a barometric pressure as barometric pressure setting 126 into altimeter 102 on aircraft 100 of FIG. 1.

The reduction in resources needed to fly, the aircraft that remains certified for flight by a pilot, without a pilot on board the aircraft, affording by baroverter 120 and processes incorporating the use thereof offer several technical advantages. These technical advantages may be, for example, allowing the aircraft that remains certified for flight by a pilot to be flown without a pilot on board without having to retrofit, recertify, or add any equipment or instruments to the aircraft. Applicant is not aware of any current machine or process that enables this technical advantage.

This technical advantage allows savings that will eliminate costs of time, man hours, aircraft down time, resources, material, and equipment, required to fly the aircraft that remains certified for flight by a pilot to be flown without a pilot on board. By providing a machine and process that creates new coding for flight management computer 106 that controls autopilot 114 and aircraft 100, baroverter 120 adds a dual capability to the aircraft that remains certified for flight by a pilot to be flown without a pilot on board. Even if the aircraft requires an additional certification for unmanned flight, no review or recertification for any of the equipment and/or instruments currently installed on the aircraft is required when baroverter 120 is located in ops center 110.

Additionally, baroverter 120 may reduce the cost and time for design and manufacturing, as well as potential for reduced infrastructure costs associated with producing aircraft certified for flight both with a flight crew and unmanned. Hence, large groups of aircraft may be produced or converted for customers using baroverter 120 at least as shown in embodiments presented and described for the figures above. Further, manufacturers may be able to more efficiently produce aircraft with the technical advantages provided by baroverter 120.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A process for pilotlessly flying, an aircraft certified for flight by a pilot, at a specified altitude, the process comprising:
    setting a fixed barometric pressure in an altimeter in the aircraft, forming a fixed altimeter setting;
    receiving an assigned altitude for the aircraft to fly;
    receiving a barometric pressure for a location of the aircraft;
    determining a differential between a height above mean sea level indicated on an altimeter using the barometric pressure for the location of the aircraft and a height above mean sea level indicated on an altimeter using the fixed altimeter setting;
    modifying, using the differential, a flight planned altitude for the aircraft, and creating a pilotless altitude; and
    flying the aircraft at the assigned altitude via directing the aircraft to fly at the pilotless altitude indicating on the altimeter in the aircraft.

2. The process of claim 1, further comprising:
    the aircraft that remains certified for flight by the pilot comprising an altimeter configured to receive the fixed barometric pressure from an input via a selector on the altimeter.

3. The process of claim 1, further comprising:
    receiving the assigned altitude for a region of airspace.

4. The process of claim 3, further comprising:
    the location of the aircraft being within the region of airspace.

5. The process of claim 1, further comprising:
    an air traffic control clearance comprising the assigned altitude.

6. The process of claim 1, further comprising:
    sending the pilotless altitude to the aircraft in a region requiring the aircraft to fly the aircraft at the assigned altitude.

7. The process of claim 1, further comprising:
    receiving the assigned altitude for the aircraft to fly and the barometric pressure for the location of the aircraft in an operations center.

8. The process of claim 7, further comprising:
    the operations center sending the pilotless altitude to the aircraft via updating a flight plan in a flight management system for the aircraft for at least a region comprising the location of the aircraft.

9. The process of claim 1, further comprising:
    directing the aircraft to fly at the pilotless altitude via a flight control system receiving a height above mean sea level input from the altimeter in the aircraft.

10. The process of claim 1, further comprising:
    receiving a new barometric pressure for a location of the aircraft for each new region the aircraft enters.

11. The process of claim 10, further comprising:
    modifying the pilotless altitude for each new region the aircraft enters.

12. A process for changing an altitude flown by an aircraft, certified for flight by a pilot, responsive to a change in barometric pressure, while flying the aircraft pilotlessly while an altimeter setting in the aircraft comprises a fixed altimeter setting, the process comprising:
    setting a fixed barometric pressure in an altimeter in the aircraft, forming the fixed altimeter setting;
    receiving an assigned altitude for the aircraft to fly;
    receiving a barometric pressure for a location of the aircraft;
    receiving a new barometric pressure for the location of the aircraft;
    determining a differential between a height above mean sea level indicated on an altimeter using the new barometric pressure for the location of the aircraft and a height above mean sea level indicated on an altimeter using the fixed altimeter setting;
    modifying, using the differential, a flight planned altitude for the aircraft, and creating a pilotless altitude; and
    flying the aircraft at the assigned altitude, responsive to the change in barometric pressure, via directing the aircraft to fly at the pilotless altitude indicating on the altimeter in the aircraft that remains certified for flight by the pilot.

13. The process of claim 12, further comprising:
receiving the assigned altitude for a region of airspace.

14. The process of claim 13, further comprising:
the location of the aircraft being within the region of airspace.

15. The process of claim 12, further comprising:
the assigned altitude being an air traffic control clearance.

16. The process of claim 12, further comprising:
the new barometric pressure applying to an air traffic control clearance for a region of space in which the aircraft is located.

17. The process of claim 12, further comprising:
creating the pilotless altitude and sending the pilotless altitude to the aircraft from an operations center receiving communications from air traffic control.

18. The process of claim 17, further comprising:
the communications from air traffic control being at least one of: verbal and automated.

19. A machine that comprises a computer code specially programmed on a non-transitory medium to change an altitude, of an aircraft that remains certified for flight by a pilot, such that the aircraft comprises an altimeter that comprises a fixed altimeter setting, the computer code configured to:
receive an assigned altitude for the aircraft to fly;
receive a barometric pressure for a location of the aircraft;
receive a new barometric pressure for the location of the aircraft;
determine a differential between a height above mean sea level indicated on an altimeter using the new barometric pressure for the location of the aircraft and a height above mean sea level indicated on an altimeter based upon the fixed altimeter setting;
modify, based upon the differential, a flight planned altitude for the aircraft, to create a pilotless altitude;
send the pilotless altitude to the aircraft; and
fly the aircraft at the assigned altitude via commands to fly at the pilotless altitude.

20. The machine of claim 19, further comprising the computer code configured to send the pilotless altitude to a flight management system for the aircraft, such that the flight management system directs a flight control system for the aircraft configured to receive the height above mean sea level indicated on the altimeter comprising the fixed altimeter setting.

* * * * *